United States Patent
Knapp

(10) Patent No.: US 6,823,892 B1
(45) Date of Patent: Nov. 30, 2004

(54) AUTOMATIC VALVE FOR THE STABILIZATION OF A THERMOSTATIC MIXING DEVICE

(75) Inventor: Alfons Knapp, Biberach/Riss (DE)

(73) Assignee: Masco Corporation of Indiana, Indianapolis, IN (US)

( * ) Notice: Subject to any disclaimer, the term of this patent is extended or adjusted under 35 U.S.C. 154(b) by 180 days.

(21) Appl. No.: 10/088,700
(22) PCT Filed: Jul. 29, 2000
(86) PCT No.: PCT/EP00/07353
§ 371 (c)(1), (2), (4) Date: Mar. 21, 2002
(87) PCT Pub. No.: WO01/22185
PCT Pub. Date: Mar. 29, 2001

(30) Foreign Application Priority Data

Sep. 21, 1999 (IT) ......................................... TO99A0802

(51) Int. Cl.[7] ............................. F16K 21/02; G05D 7/01
(52) U.S. Cl. ..................... 137/512.2; 137/854; 138/46; 236/12.15
(58) Field of Search ............................. 137/512.2, 854; 138/46; 236/12.1, 12.15

(56) References Cited

U.S. PATENT DOCUMENTS

| | | | | |
|---|---|---|---|---|
| 423,003 A | * | 3/1890 | Vielhaber | 137/512.2 |
| 1,243,999 A | * | 10/1917 | Snediker | 236/12.14 |
| 1,950,575 A | * | 3/1934 | Smolensky | 137/512.2 |
| 2,317,717 A | * | 4/1943 | Bauman | 236/12.22 |
| 2,503,901 A | * | 4/1950 | Chace | 236/12.15 |
| 2,560,293 A | * | 7/1951 | Kempton | 236/12.2 |
| 2,620,133 A | * | 12/1952 | Obermaier | 236/12.13 |
| 2,960,996 A | * | 11/1960 | Haselton | 137/512.2 |
| 3,036,777 A | * | 5/1962 | Budde | 236/12.2 |
| 3,762,433 A | * | 10/1973 | Moore | 137/469 |

FOREIGN PATENT DOCUMENTS

| | | | |
|---|---|---|---|
| DE | 872908 C | * | 8/1952 |
| DE | 8906400 U | * | 9/1990 |
| GB | 2270139 A | * | 3/1994 |
| WO | WO99/46652 | * | 9/1999 |

* cited by examiner

Primary Examiner—John Rivell
(74) Attorney, Agent, or Firm—Kwadjo Adusei-Poku; Lloyd D. Doigan

(57) ABSTRACT

A valve installed at the inlet of a thermostatic mixing device for automatically stabilizing the operation of the thermostatic device by maintaining the pressure within the thermostatic mixing device close to the water supply pressure, thereby making the thermostatic device response to small pressure changes while maintaining the fluid flow through the device. The valve comprises a tubular body inserted within the water supply line, a holding seat within the tubular body, a cursor that moves within the valve body with respect to the seat, the cursor moving between a first position where the seat is partially occluded and a second position where the seat is substantially clear. The cursor is subjected to the pressure existing inside the thermostatic mixing device, and a spring positioned with the valve body that acts upon the cursor to urge the cursor towards the first cursor position.

16 Claims, 4 Drawing Sheets

US 6,823,892 B1

AUTOMATIC VALVE FOR THE STABILIZATION OF A THERMOSTATIC MIXING DEVICE

TECHNICAL FIELD

This invention relates to an automatic valve intended for installation in the inlet of a thermostatic mixing device to stabilize its operation.

BACKGROUND OF THE DISCLOSURE

When a thermostatic mixing device, designed to be able to draw a certain flow rate, supplies an apparatus which, because of the high resistance that it creates against the flow, permits only the delivery of a much lesser flow rate, the pressure inside the thermostatic mixing device becomes close to the pressure in the water supply pipelines. If there develops, then, a considerable pressure difference between the hot water and the cold water supply pipelines, for example, due to the absorption of an apparatus with a high flow rate, such as a flowmeter flushing water device inserted on one of the pipelines due to the crosswise flow (the so-called cross-flow) that develops inside the thermostatic mixing device, the latter is in a state of instability or begins to oscillate with subsequent malfunctioning and instability of the temperature of the mixed water drawn by it.

This happens, for example, when a thermostatic mixing device, intended to supply in the absence of a strong resistance at the outlet a relatively high flow rate, such as, for example, 50 or 60 liters per minute at 3 bar, is used with a much lesser water delivery volume, for example, 9 liters per minute, which is limited by the resistance offered to the flow by certain apparatuses. This case occurs, in particular, when the thermostatic mixing device is installed to supply a multiple shower stall, each of which is equipped with its own exclusion device, while the user employs only one shower. More generally, the same case occurs when the thermostatic mixing device is arranged to supply a plurality of apparatuses or only one or a few of them are actually in operation.

This inconvenience can be remedied by installing a pressure compensator in the water supply pipelines up the line from the thermostatic mixing device. However, this additional apparatus increases the size and complexity of the installation also because it must be linked to both of the cold water and hot water supply pipes; that increases the cost of the apparatuses and the installation operations; besides, it is a rather delicate operation; it is easily subject to failure, especially due to deposits, and calls for a certain degree of maintenance. Its operation is not entirely satisfactory because, when the pressure in a pipeline is reduced, the compensator reduces the passage offered to the other pipeline and thus corrects the mixing ratio but modifies the flow rate that is actually drawn. Furthermore, under certain conditions, a pressure compensator can give rise to instability phenomenon.

According to Italian Patent Application No. 99 A 000 455, a thermostatic mixing device, controlled by thin obstruction plates situated at its inlet, can be arranged so as to function correctly, both when the maximum flow rates for which it was designed are drawn and also when reduced flow rates are drawn in the water supply lines of apparatuses with high flow resistance without entailing the above-mentioned inconvenience and without necessitating a pressure compensator by having the user arrange the thermostatic mixing faucet so as to adapt it to the various conditions of use or to the power supply of apparatuses that absorb flow rates that differ widely among each other.

This can be achieved by virtue of the fact that the entry passage openings of the thin blocking plates, which control the inlet pipes for the hot water and for the cold water, are shaped in relation to at least one of the pipelines for hot water and for cold water so as to present restricted passage cross-sections in a field adjacent to the occlusion position and large cross-section passage segments in the remaining regulating field.

In this way, when the thermostatic mixing faucet must supply one or several apparatuses that take a small flow rate, it is moved in its first regulation field, which takes place the moment the thermostatic mixing faucet is shifted from the occlusion position. The restricted cross-section of at least one of the entry passage openings then causes a relatively high pressure drop, although in the presence of a small flow rate caused by the high resistance at the outlet, and makes the thermostatic mixing faucet practically insensitive (to the effects of its stability) in contrast to the also significant pressure differences between the water supply pipelines. When, on the other hand, the thermostatic mixing faucet must supply apparatuses that absorb a large flow rate, it is moved into its second regulating field, which follows the first one. The large cross-section of the entry passage openings then makes it possible to draw the maximum flow rate that the thermostatic mixing faucet is capable of and, under these conditions, any possible, even significant, pressure differences between the water supply pipelines will not cause any inconvenience.

This provision ensures the perfect operation of a thermostatic mixing faucet, but it requires a maneuver, albeit a simple one, on the part of the user, and, furthermore, it cannot be applied to thermostatic mixing devices at whose inlet thin blocking plates are not installed.

In view of this, the primary purpose of this invention is to provide a valve intended to be installed at the inlet of a thermostatic mixing device of any kind, which would be suitable for automatically bringing about a performance in accordance with the one that is caused by the above-mentioned provision, causing a partial division of the passage cross-section, while the thermostatic mixing device supplies an apparatus with low water flow demand, which offers high resistance against the flow and, on the other hand, leaving the water supply line substantially clear, while the thermostatic mixing device supplies one or several apparatuses with a high overall water flow demand, which, together, gives rise to a low resistance against the flow.

Another object of the invention is to provide such an automatic valve, which would furthermore combine the function of a nonreturn valve as is required in many cases in which it is installed.

Yet another object of the invention is to provide such a valve, which would have a simple structure, be easy to manufacture, relatively cheap and so designed as to facilitate maintenance.

SUMMARY OF THE DISCLOSURE

The first object of the invention is achieved in a valve intended for installation in the inlet of a thermostatic mixing device by virtue of the fact that the valve comprises a tubular body intended to be inserted in or constitute part of a pipe or connection for water supply, said body having a holding seat; a cursor that can be moved in said body with respect to said seat between a first position in which it at least partly occludes said seat, and a second position in which it leaves said seat substantially clear to permit the passage of a relatively large flow rate, said cursor being subjected, on the one hand, to the pressure of the water supply pipeline and, on the other hand, to the pressure existing inside said mixing device; and a spring that works on said cursor, pushing it toward said first position, said spring being dimensioned so that said cursor, with respect to said seat, will assume said first position or a position close to it under conditions in which the water flow demanded by said mixing device is relatively low, and will be shifted toward said second position or until it reaches it under conditions in which the water flow demanded by said mixing device is relatively high; wherein said cursor comprises means which, when said cursor assumes said first position or a position close to it, permit the passage of a flow rate sufficient only to supply a mixing device with a relatively low water flow demand.

In this way, when the water supply of an apparatus with low water flow demand tends to cause inside the thermostatic mixing device the establishment of a pressure close to the water supply pressure, the small difference between these pressures causes the cursor to assume a position close to said first position or coinciding with it and leaving clear a small passage cross-section, thus causing a pressure drop because of which the pressure that is actually established inside the thermostatic mixing device is limited and cannot give rise to any instability. When, on the other hand, the supply to apparatuses having a high overall water flow demand is such that inside the thermostatic mixing device a very low pressure develops, then the cursor, pushed by a greater pressure difference, assumes a position close to the second position while coinciding with it, leaving clear a largepassage cross-section, thus not causing a pressure drop that would appreciably reduce the volume of water drawn, whereas, on the other hand, under these conditions, the thermostatic mixing device does not tend to display any unstable performance. The valve thus automatically—and independently of the kind of thermostatic mixing device involved—brings about the same effect that can be achieved by an appropriate maneuver employed by the user according to the teaching in Italian Patent Application TO 99 A 000 455.

An automatic valve, according to the invention, can be inserted in only one water supply pipeline or in both, but preferably it is inserted only in the cold water supply pipeline.

The second object of the invention is achieved when the cursor in said first position occludes the seat totally. In this case, as a matter of fact, when no water is drawn or if the flow tends to assume a direction opposite to the normal direction, the cursor, shifting into said first position, completely occludes said seat so that the valve works like a nonreturn valve.

The second object of the invention can also be achieved—even if the cursor in said first position does not totally occlude said seat—by inserting in the valve an element, for example, a flexible and elastic membrane arranged so as to occlude at least one passage opening, while the flow tends to assume a direction opposite to the normal direction.

The structure of the valve, according to the invention, can assume various configurations that are specifically indicated in the following description and in the subclaims. These and other features, objects and advantages of the object of this invention will appear more clearly in the following description of some embodiments, constituting nonrestrictive examples, with reference to the attached drawings.

BRIEF DESCRIPTION OF THE DRAWINGS

Reference now is made to the accompanying drawings in which.

DETAILED DESCRIPTION OF THE PREFERRED EMBODIMENTS

Figure 1:
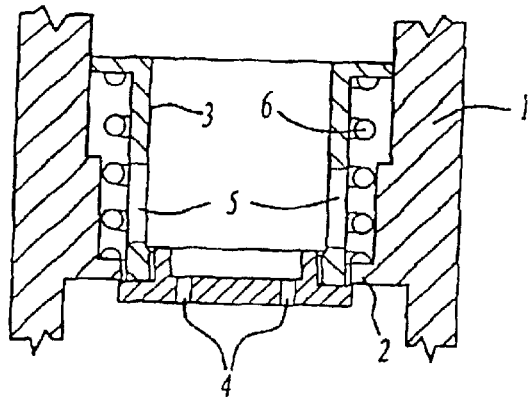
FIG. 1 is a diametrical cross-section, illustrating a first embodiment among the simplest possible ones of the valve, according to the invention, in its first position.
Figure 2:
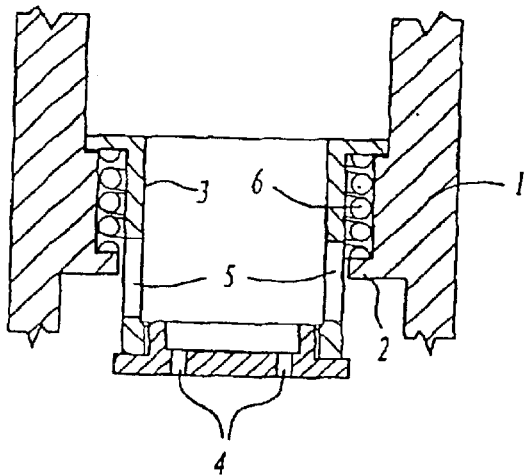
FIG. 2 illustrates the valve, according to said first embodiment, in its second position.

With reference to FIGS. 1 and 2, a first, very simple embodiment of the valve, according to the invention, comprises a tubular body 1 intended to be inserted in or constitute part of at least one pipeline or connection for supplying a thermostatic mixing device, a holding seat 2 presented by said body 1, and a cursor 3 that can be moved in said body 1 with respect to said seat 2 between a first position (FIG. 1) in which it partially occludes said seat 2 and a second position (FIG. 2) in which it substantially leaves said seat 2 clear. This cursor is obviously subjected, on the one hand, to the (higher) pressure (according to the figures) of the water supply pipeline and, on the other hand, to the pressure (which is lower, according to the figures) that is present inside the thermostatic device. Cursor 3 has one or several openings 4, which are always pervious and which are so dimensioned as to allow the passage of a flow that is sufficient only to supply an apparatus with low intake, and openings 5, which are so dimensioned as to permit the passage of a large flow, which become pervious only when cursor 3 leaves its first position and moves toward the second position or reaches it. The valve furthermore comprises a spring 6 that acts on cursor 3, moving it toward the first occlusion position, and said spring 6 is so dimensioned that the pressure drop that is experienced by a small flow through openings 4 will not be sufficient to overcome the force of the spring when it is required to expose passage openings 5 so that cursor 3, with respect to seat 2, maintains a position that causes a reduced passage cross-section, that is, the cross-section of openings 4 only, under conditions involving the supply of an apparatus with low absorption. On the other hand, under conditions involving the supply of apparatuses having a high overall absorption, the pressure difference that works on cursor 3 (downward, according to the figures), overcoming the force of spring 6, shifts cursor 3 toward the second position or until it reaches it (FIG. 2) and uncovers the passage openings 5. In this way, cursor 3, with respect to seat 2, assumes a position that brings about a large passage cross-section under conditions involving the supply of apparatuses having a high overall absorption, and it does not obstruct the passage of a large flow rate.

It follows from this that the valve protects the thermostatic mixing device, preventing the development of a high pressure in it when a low-absorption apparatus is supplied, while the valve does not appreciably obstruct the flow when one or several apparatuses with high overall absorption are supplied.

Figure 3:
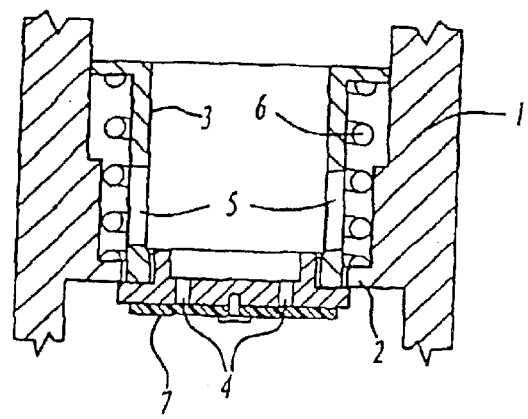
FIG. 3 and FIG. 4 illustrate, respectively, in the first and in the second positions, a second embodiment of the valve, according to the invention.
Figure 4:
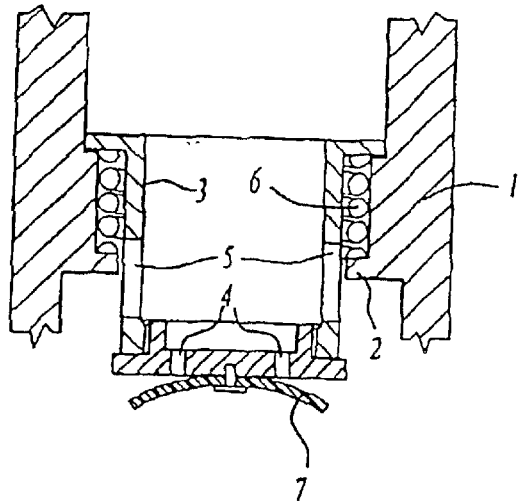

FIGS. 3 and 4 show how the valve, according to the preceding figures, can in a simple manner be made to work also as a nonreturn valve. In this case, a flexible and elastic membrane 7 is applied to cursor 3, corresponding to its openings 4. As long as no flow runs through the valve or if the flow tends to be inverted, membrane 7 occludes openings 4, while openings 5 are not pervious because spring 6 keeps the valve in its first position. A flow in the opposite direction is thus prevented. On the other hand, the moment an even minimal pressure difference develops at the heads of the valves in the normal direction of water supply, membrane 7 is lifted, thus clearing openings 4. This is represented in correspondence to the second position of the valve in FIG. 4; but it is understood that membrane 7 is raised in the presence of a small flow also if cursor 3 remains in its first position or close to it. Membrane 7 will serve to occlude openings 4 when openings 4 are located at this distal end of cursor 3, as shown in FIGS. 1–4 and 9–10.

Figure 5:
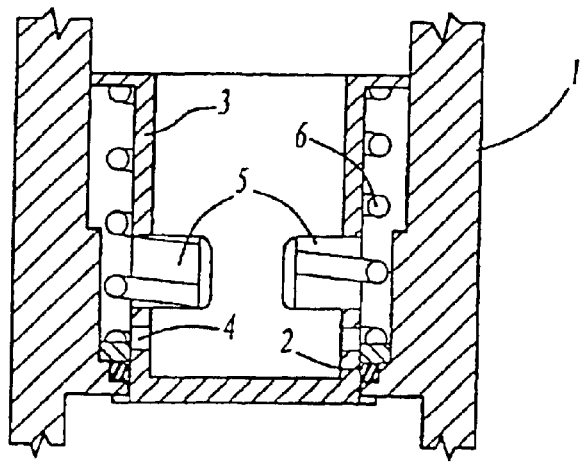
FIG. 5, FIG. 6 and FIG. 7 illustrate in three different operating positions a third embodiment of the valve, according to the invention.
Figure 6:
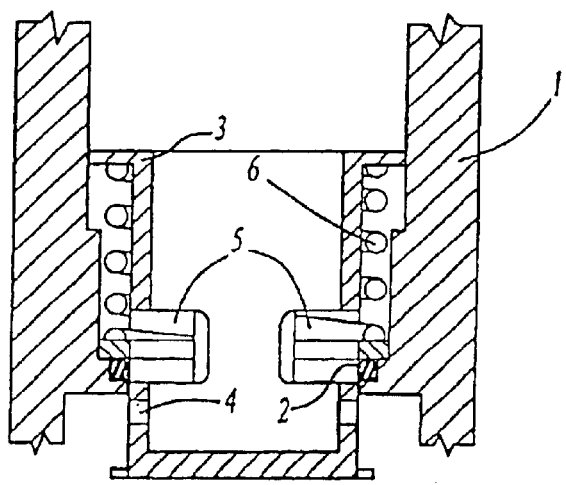
Figure 7:
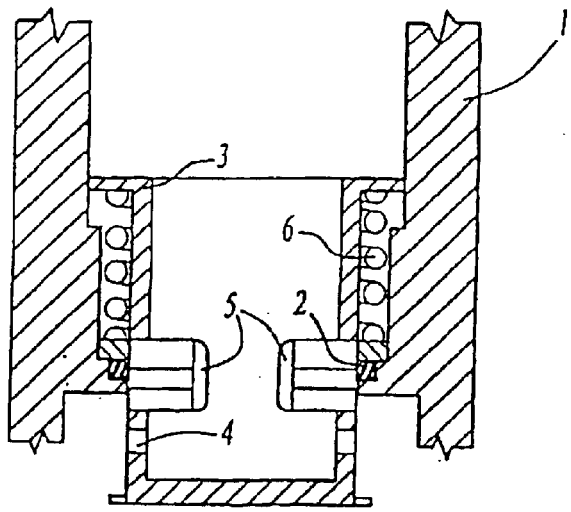

The valve according to FIGS. 5 and 7 differs from the one according to FIGS. 1 and 2 only by virtue of the fact that in cursor 3, opening 4, intended to permit the passage of a reduced flow, is also located in the first position up the line from seat 2 and precisely between openings 5 that are intended to permit the passage of a strong flow and seat 2. Therefore, when cursor 3 is in its first position (FIG. 5), it completely occludes seat 2: the valve thus works as a nonreturn valve. When a small pressure difference is developed at the heads of the valve, spring 6 permits only a small shift of cursor 3, which remains in the proximity of its first position (FIG. 6), while only opening 4 is exposed, permitting the passage of a reduced flow and preventing the establishment of a high pressure in the thermostatic mixing device. By increasing the pressure difference at the heads of the valve, spring 6 permits a further shift of cursor 3 toward its second position (FIG. 7) and openings 5, which permit the passage of a large flow, are then uncovered.

Figure 8:
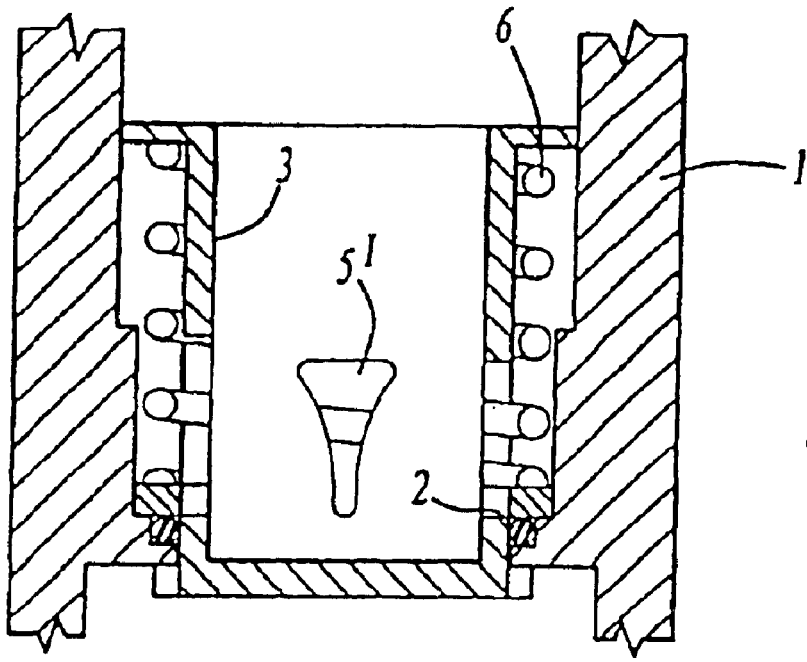
FIG. 8 and FIG. 9 illustrate, respectively, in the first and in the second positions, a fourth embodiment of the valve, according to the invention.
Figure 9:
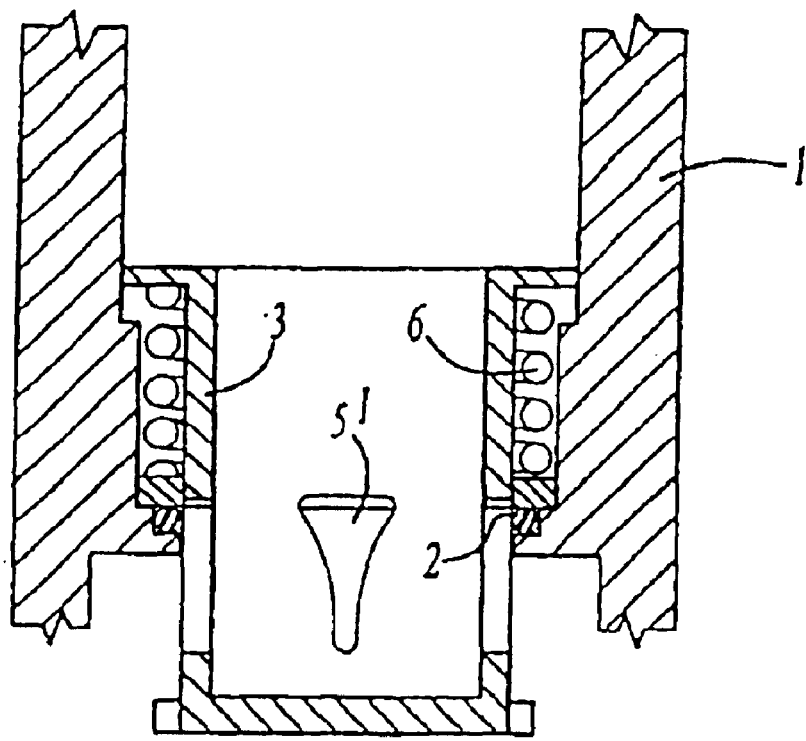

The valve, according to FIGS. 8 and 9, works in an entirely similar fashion; here, small passage openings 4 and large passage openings 5 are replaced by openings 5' that have a shape that tapers toward seat 2, which thus assume the functions both of openings 4 and of openings 5 with a gradual increase in the pressure cross-section, along with the increase in the shift of cursor 3. The valve, thus described, also has a nonreturn function because openings 5', with their tapered shape, are entirely up the line from seat 2 when the valve is in the resting position.

Figure 10:
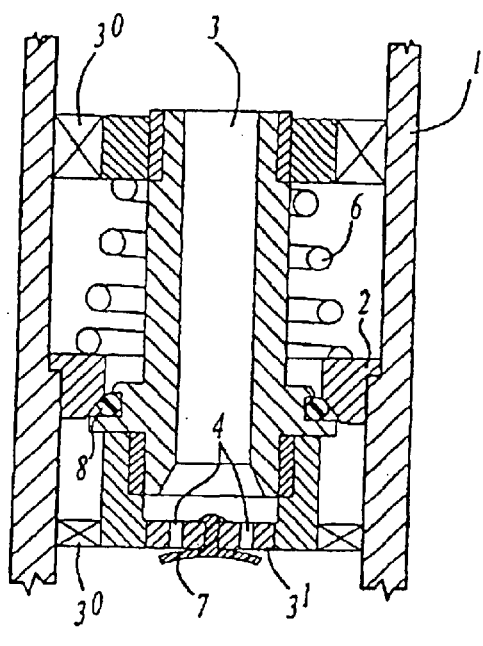
FIG. 10 and FIG. 11 illustrate, respectively, in the first and in the second positions, a fifth embodiment of the valve, according to the invention.
Figure 11:
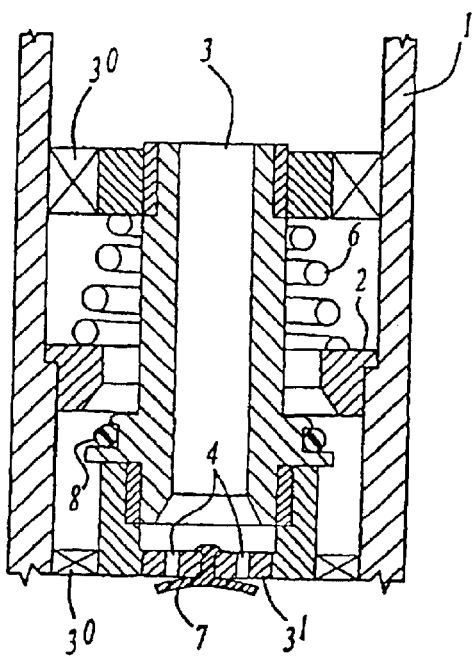

The valve, according to FIGS. 10 and 11, operates in the same way as a valve, although it also acts as a nonreturn valve, according to FIGS. 3 and 4, with cursor 3 having a more elaborate structure; in this case, it is made up of several parts to ensure safe guidance in body 1 and to permit a more free passage of the flow in the second position of the valve. In this case, cursor 3 has parts $3^D$, which run against the internal surface of body 1 to guide the cursor, and it brings about a closure on seat 2 by means of a packing 8. The removal of this packing 8 from seat 2 brings about large passage cross-sections, which replace openings 5. In this case, openings 4, with which cooperates nonreturn membrane 7, can be made in a part 3' of cursor 3, which can be replaced. It thus becomes possible in the best way to adapt to the operating characteristics of the valve, both to the flow rate required by the apparatus with the lesser absorption, which is to be supplied with water, and to the pressure that normally exists in the water supply network.

Figure 12:
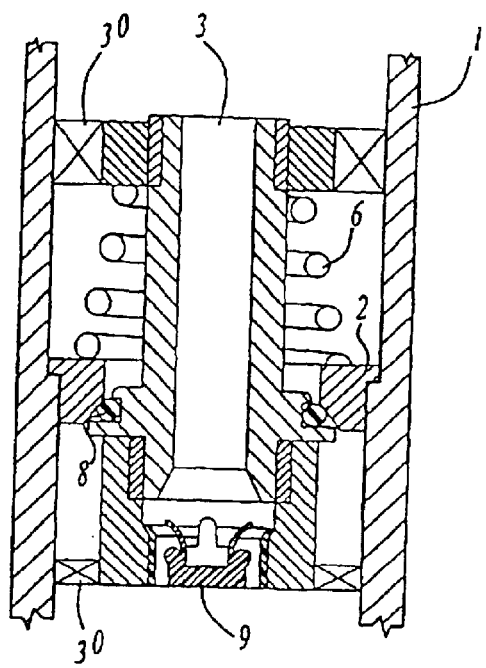
FIG. 12 and FIG. 13 illustrate, respectively, in the first and in the second positions, a sixth embodiment of the valve, according to the invention.
Figure 13:
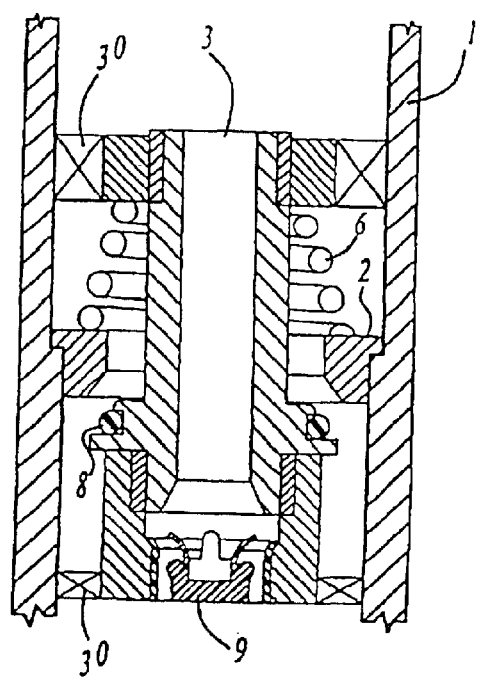

In the embodiment, according to FIGS. 12 and 13, which, by the way, is similar to the embodiment, according to FIGS. 10 and 11, openings 4 with a small cross-section are replaced by a so-called flow rate regulator 9. A flow rate regulator is a known accessory, which is commercially available; it always permits the passage of a flow rate close to a predetermined value, regardless of the pressure that may develop at its heads (within certain limits). Therefore, this accessory replaces narrow openings 4 in the valve according to the invention and, with respect to them, offers the advantage that it does not have to be adapted to the pressure normally prevailing in the water supply network.

These flow rate regulators are commercially available also connected to a nonreturn valve (for example, according to German Patent Application No. 196 03 393) and can as such be applied in the valves, according to the invention, in cases where it is advisable to prevent an inverted flow.

It must be understood that a flow rate regulator can be employed by way of substitution of openings 4 with a small cross-section also in some of the embodiments described earlier.

As noted earlier, the automatic valve, according to the invention, can be inserted in both hot water and cold water supply pipelines or alternately in only one of them, preferably the one for the cold water, while the other water supply pipeline does not have any such valve.

The user, therefore, does not have to preset the thermostatic mixing device for correct operation under conditions different from those selected by him because that job is automatically done by the valve according to the invention. In addition to making the entire operation much easier for the user, this also prevents any possibility of error on the part of the user.

A valve intended for installation in the inlet of a thermostatic mixing device is disclosed, which comprises a tubular body intended to be inserted in a water supply pipe, a holding seat presented by said body, a cursor that can be moved in the body with respect to the seat between a first position in which it at least partly occludes the seat and a second position in which it leaves the seat substantially clear, said cursor being subjected, on the one hand, to the pressure of the water supply pipeline and, on the other hand, to the pressure existing inside the thermostatic mixing device, and a spring that works on the cursor, pushing it toward the occlusion position, said spring being dimensioned so that the cursor, with respect to the seat, will assume a position that brings about a reduced passage cross-section under conditions involved in the water supply of an apparatus that has a low degree of absorption and in which, with respect to the seat, it assumes a position causing a large passage cross-section under conditions involved in the water supply of apparatuses featuring a total high absorption. The valve can also comprise means that act as a nonreturn valve, and it can be equipped with a flow rate regulator.

It must be understood that the invention is not confined to the embodiments described and illustrated by way of example. A number of modifications, in addition to those already described, are within the reach of the expert in the field, for example, the various passage openings can be configured in various ways, and in this way, one can come up with various configurations of a nonreturn device. Besides, the valves can also be completed by other accessories such as, for example, a water filtration net.

These and other modifications and any substitution with technical equivalents can be introduced to the devices described and illustrated without departing from the scope and spirit of the present invention as defined by the appended claims.

What is claimed is:

1. A valve intended for installation in the inlet of a thermostatic mixing device, characterized in that it comprises a tubular body intended to be inserted in or constitute part of a pipe or connection for water supply, a holding seat presented by said body, a cursor that can be moved in said body with respect to said seat between a first position in which it at least partly occludes said seat and a second position in which it leaves said seat substantially clear, said cursor being subjected, on the one hand, to the pressure of the water supply pipeline and, on the other hand, to the pressure existing inside the thermostatic mixing device, and a spring that works on said cursor, pushing it toward the occlusion position, said spring being dimensioned so that the cursor, with respect to the seat, will assume a position that brings about a reduced passage cross-section under conditions involved in the water supply of an apparatus that has a low degree of absorption and in which, with respect to the seat, it assumes a position causing a large passage cross-section under conditions involved in the water supply of apparatuses featuring a total high absorption.

2. Automatic valve according to claim 1, characterized in that the cursor in said first position totally occludes said seat so that the valve will also work as a nonreturn valve.

3. The automatic valve according to claim 1, further comprising an element intended to act as a nonreturn valve, the element being attached to the cursor and inserted within the tubular body.

4. Automatic valve according to claim 3, characterized in that said element, functioning as a nonreturn valve, consists of a flexible and elastic membrane, arranged so as to occlude at least one passage opening, while the flow tends to assume a direction opposite to the normal direction.

5. The automatic valve according to claim 1, characterized in that said cursor has at least one opening with small dimensions, intended to permit the passage of a flow rate sufficient only to supply an apparatus with low absorption.

6. Automatic valve according to claim 5, characterized in that at least one opening with small dimensions is permanently pervious.

7. Automatic valve according to claim 5, characterized in that said opening, at least having small dimensions, is situated in the first position up the line from said seat and becomes pervious only when the cursor undergoes a minor shift toward its second position.

8. The automatic valve according to claim 1, characterized in that said cursor presents openings with large dimensions, situated in the first position or in a position close to said first position up the line from said seat, which belong pervious when the cursor shifts towards its second position or reaches said second position.

9. Automatic valve according to claim 8, characterized in that said openings with large dimensions have a tapered form so as to become pervious in an increasing manner, along with the increase in the shift of the cursor from the first position to the second position.

10. Automatic valve according to claim 9, characterized in that said openings with the tapered shape are situated in the first position entirely up the line from said seat so that the valve will also work as a nonreturn valve.

11. The automatic valve according to claim 2, characterized in that said cursor has a holding packing, acting in the first position with respect to said seat, and whose removal, when the cursor is shifted toward the second position, clears wide passage cross-sections.

12. The automatic valve according to claim 1, characterized in that mounted in said cursor is a known flow rate regulator whose substantially constant flow rate is adapted to the anticipated supply flow rate of an apparatus with low absorption.

13. Automatic valve according to claim 12, characterized in that said flow rate regulator is of a type provided with means that act as nonreturn valve.

14. The automatic valve according to one of claims 1, 2, 4 or 9, characterized by its installation in both water supply pipelines of a thermoplastic mixing device.

15. The automatic valve according to one of claims 1, 2, 4 or 9, characterized by its installation in only one of the water supply pipelines of a thermoplastic mixing device.

16. The automatic valve according to one of claims 1, 2, 4, or 9, characterized by its installation in the cold water supply pipeline going to a thermoplastic mixing device.

* * * * *